United States Patent [19]
Iijima

[11] Patent Number: 5,519,376
[45] Date of Patent: May 21, 1996

[54] ANTITHEFT APPARATUS FOR AUTOMOTIVE VEHICLE

[75] Inventor: Yohichi Iijima, Hadano, Japan

[73] Assignee: Nissan Motor Co., Ltd., Kanagawa, Japan

[21] Appl. No.: 437,745

[22] Filed: May 9, 1995

[30] Foreign Application Priority Data

May 10, 1994 [JP] Japan .................................. 6-096716

[51] Int. Cl.[6] .................................................. B60R 25/10
[52] U.S. Cl. ...................... 340/426; 340/428; 307/10.2; 307/10.3; 307/10.6; 180/287
[58] Field of Search ................................ 340/426, 428, 340/429, 430; 307/10.2, 10.3, 10.4, 10.5, 10.6; 180/287

[56] References Cited

U.S. PATENT DOCUMENTS

| | | | |
|---|---|---|---|
| 4,835,407 | 5/1989 | Kataoka et al. | 180/287 |
| 4,965,460 | 10/1990 | Tanaka et al. | 180/287 |
| 5,079,435 | 1/1992 | Tanaka | 180/287 |
| 5,254,842 | 10/1993 | Posner et al. | 307/10.2 |
| 5,337,588 | 8/1994 | Chhatwal | 307/10.2 |

FOREIGN PATENT DOCUMENTS 64-56253  3/1989  Japan .

Primary Examiner—Brent A. Swarthout
Assistant Examiner—Nina Tong
Attorney, Agent, or Firm—Lowe, Price, LeBlanc & Becker

[57] ABSTRACT

An antitheft apparatus for an automotive vehicle comprises: a transponder (1) buried in an ignition key to store an ID number thereof; a receive unit (2) to receive the ID number of the ignition key inserted into the ignition key cylinder; an immobilizer unit (3) for outputting an engine start enable signal when the received ID number matches one of the stored ID numbers and not outputting the engine start enable signal when does not match; and an engine control unit (5) for enabling an engine drive in response to the reception of the engine start enable signal but disabling the engine drive in response to no reception of the engine start enable signal. In particular, the engine drive unit (5) keeps the immobilizer unit (3) inoperative for a predetermined time duration when the engine cranking operation is detected and allows the immobilizer unit (3) to be operative after the predetermined time has elapsed. Therefore, even if the cranking voltage is intentionally applied to disable the antitheft apparatus, since the antitheft apparatus can be restored after a predetermined time has elapsed and thereby the ID collation can be executed, it is possible to stop the engine from being started by use of a non-registered ignition key or stop the already driven engine, securely.

4 Claims, 2 Drawing Sheets

ANTITHEFT APPARATUS FOR AUTOMOTIVE VEHICLE

BACKGROUND OF THE INVENTION

1. Technical Field

The present invention relates to an antitheft apparatus for an automotive vehicle for preventing the vehicle from being stolen, by use of an ID (identification) number allocated to each ignition key.

2. Description of the Related Art

An antitheft apparatus for an automotive vehicle has been known (Japanese Published Unexamined (Kokai) Patent Application No. 64-56253). In this antitheft apparatus, a transponder is buried at a head portion of an ignition key, and a specific ID number is stored in the transponder. When the ignition key is inserted into a key hole of a key cylinder and then rotated to a start position to drive an engine of the vehicle, the ID number (a predetermined code) is read from the ignition key and then collated with a plurality of ID numbers (codes) already registered in the antitheft apparatus. Here, if the ID number of the key now used has been already registered in the antitheft apparatus, the engine can be started. On the other hand, if not registered, the engine cannot be started for prevention of vehicle from being stolen.

On the other hand, when an engine of the automotive vehicle is being cranked to start the engine by passing current from a battery to a starter motor during cranking period, since a large starting current is passed from the battery to the starter motor and further the starting current is not constant, the battery voltage fluctuates violently, so that the battery voltage is not stable. Therefore, during the above-mentioned unstable cranking period, when an ID number is read from the transponder of the ignition key for collation with the ID numbers stored in the antitheft apparatus, there exists a problem in that an ID number communication error inevitably occurs, so that the antitheft apparatus operates erroneously.

To overcome this problem, conventionally the battery voltage applied to the starter motor (referred to as a cranking voltage, hereinafter) is monitored by an engine control unit to inhibit the ID number collation operation of the antitheft apparatus only during the cranking period. In this case, however, since the antitheft apparatus is inoperative during the cranking period, when the cranking period is prolonged intentionally by some method, the use of the ID number is ineffective.

Or else, there exists another antitheft apparatus such that the engine can be started with priority over the ID number collation operation. In this case, similarly, the antitheft characteristics are inevitably degraded.

SUMMARY OF THE INVENTION

Accordingly, it is the object of the present invention to provide an antitheft apparatus for an automotive vehicle, which can keep the antitheft apparatus inoperative only during the cranking period but automatically start the operation of the antitheft apparatus, that is, the collation operation of the ID number of an ignition key now used after a predetermined time has elapsed after cranking.

To achieve the above-mentioned object, the present invention provides an antitheft apparatus for an automotive vehicle, comprising: a transponder provided in an ignition key, for storing an ID number of its own ignition key therein; a receive unit for receiving the ID number of the ignition key inserted into the ignition key cylinder; an immobilizer unit for outputting an engine start enable signal when the received ID number matches one of the stored ID numbers and not outputting an engine start enable signal when does not match; and an engine control unit for enabling an engine to drive in response to the reception of the engine start enable signal but disabling the engine to drive in response to no reception of the engine start enable signal, said engine control unit having: means for detecting an engine cranking operation; means for checking whether a predetermined time has elapsed after the engine has been cranked; and means for keeping said immobilizer unit inoperative for a predetermined time duration and allowing said immobilizer unit to be operative after the predetermined time has elapsed.

Here, the engine control unit stops the engine drive already started, when the immobilizer unit detects that the ID number collation is disabled or the collated ID number is not registered by the ID number collation executed after the predetermined time has elapsed. Further, the engine cranking operation is detected by detecting a voltage applied to an engine starter motor. The predetermined time is several seconds.

Further, the present invention provides a method of keeping an antitheft apparatus inoperative, comprising the steps of: monitoring whether a cranking voltage is applied to an engine starter motor; if YES, setting the antitheft apparatus inoperative; checking whether a predetermined time has elapsed; if NO, keeping the antitheft apparatus inoperative for a predetermined time duration; if the predetermined time has elapsed, checking whether an ignition key is inserted into an ignition key cylinder; if YES, transmitting a transmit signal to a transponder of the ignition key inserted into the ignition key cylinder to receive an ID number of the ignition key; checking whether the received ID number is registered; if YES, outputting an engine start enable signal; and if NO, not outputting an engine start enable signal.

As described above, in the antitheft apparatus according to the present invention, whenever the high cranking voltage is applied to the starter motor, the antitheft apparatus is kept inoperative for a predetermined time period but operative after a predetermined time has elapsed. Therefore, even if the cranking voltage is intentionally applied to disable the antitheft apparatus and thereby to start engine with the use of a non-registered ignition key, since the antitheft apparatus can be restored after a predetermined time has elapsed and thereby the ID collation can be executed, it is possible to prevent the engine from being started by use of a non-registered ignition key or to stop the already started engine, thus improving the antitheft characteristics of the antitheft apparatus.

DETAILED DESCRIPTION OF THE EMBODIMENTS

A basic embodiment of the antitheft apparatus for an automotive vehicle according to the present invention will be described hereinbelow with reference to the attached drawings.

Figure 1:
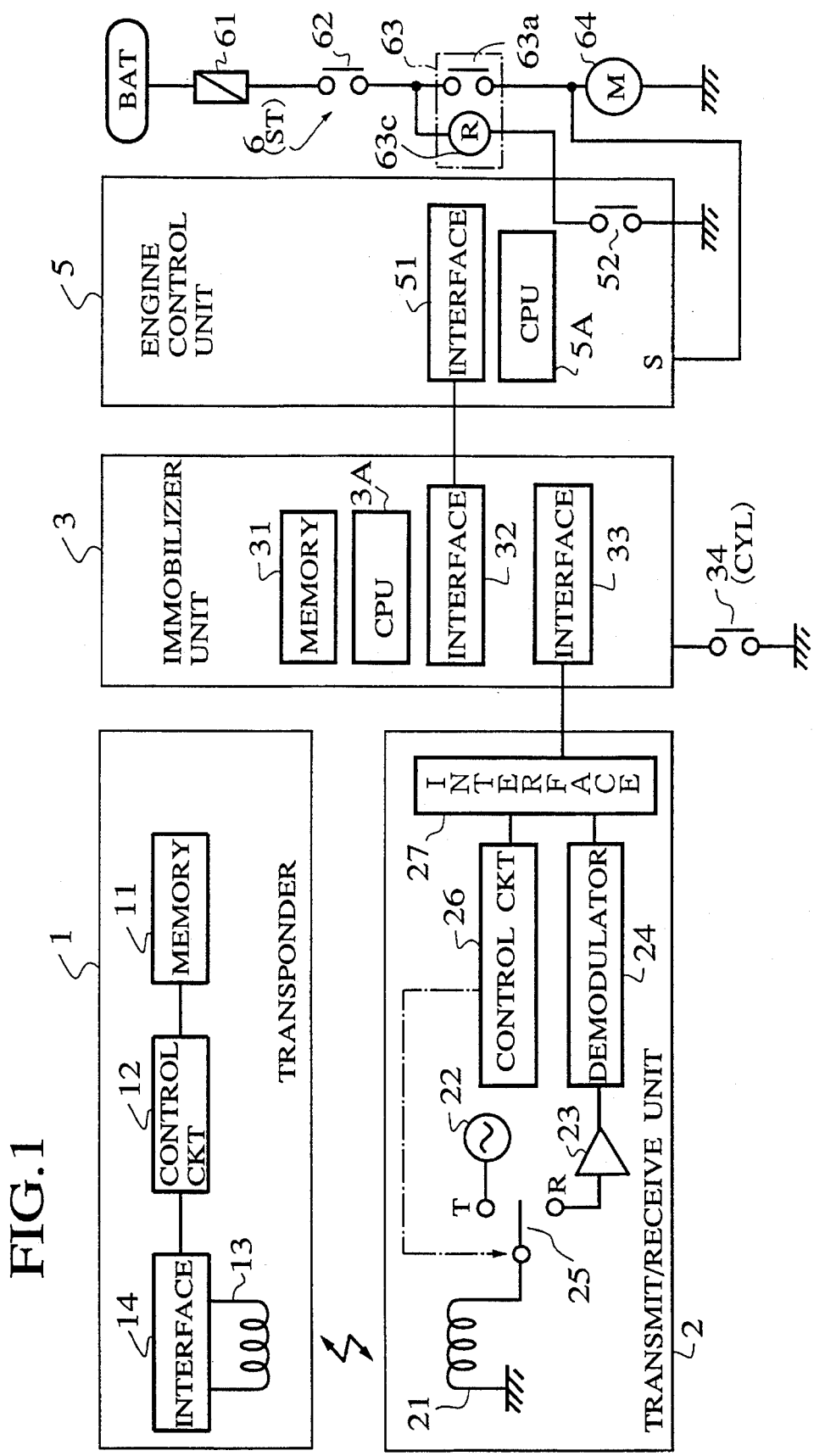
FIG. 1 is a functional block diagram showing an embodiment of the antitheft apparatus according to the present invention.

In FIG. 1, the antitheft apparatus is roughly composed of a transponder 1, a transmit/receive unit (receive unit) 2, an immobilizer unit 3, and an engine control unit 5 for starting and stopping an engine of an automotive vehicle.

Figure 2:
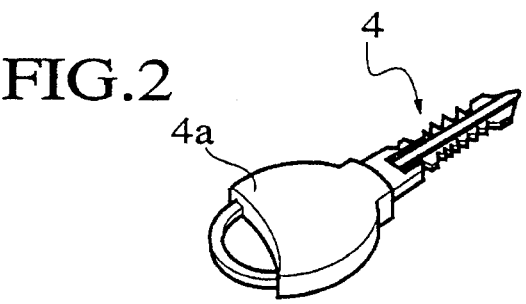
FIG. 2 is a perspective view showing an ignition key used for the antitheft apparatus.

As shown in FIG. 2, the transponder 1 is buried in a head portion 4a of an ignition key 4. The transponder 1 includes a non-volatile memory 11, a control circuit 12, an antenna 13, and an interface 14. The non-volatile memory 11 is an EEPROM (electrically erasable and programmable ROM), for instance for storing an ID (identification) number decided for each ignition key in the form of coded signals. The control circuit 12 controls the communications between the transponder 1 and the transmit/receive unit 2 via the interface 14. The interface 14 having a capacitor (not shown) therein receives and rectifies a radio wave of a predetermined frequency transmitted from the transmit/receive unit 2, and further stores the rectified signal in the capacitor as a power to transmit the ID number signal of the ignition key from the transponder 1 to the transmit/receive unit 2. In more detail, when the radio wave of the predetermined frequency is transmitted from the transmit/receive unit 2 to the transponder 1 through the antenna 21, the control circuit 12 reads the ID number signal from the memory 11 and transmits the read ID number signal to the transmit/receive unit 2 through the interface 14 by use of the power charged in the capacitor of the transponder 1.

On the other hand, the transmit/receive unit (receive unit) 2 is disposed in an ignition key cylinder (not shown) of an automotive vehicle. The transmit/receive unit 2 is composed of an antenna 21, an oscillator 22, an amplifier 23, a demodulator 24, a switch 25, a control circuit 26 and an interface 27. The oscillator 22 generates the pulse radio wave signal of a predetermined frequency to be transmitted to the transponder 1. The amplifier 23 amplifies an ID number signal transmitted from the transponder 1 and received by through antenna 21. The demodulator 24 demodulates the received ID number signal into an ID number. The switch 25 connects the oscillator 22 to the antenna 21 during ID number transmission mode, but connect the amplifier 23 to the antenna 21 in ID number reception mode. The control circuit 26 controls the communications between the transponder 1 and the transmit/receive unit 2 in accordance with commands applied from the immobilizer unit 3 through the interface 27. Upon receiving a communication command from the immobilizer unit 3, the control circuit 26 changes over a contact blade of the switch 25 to a T side, to transmit the pulse signal of a predetermined frequency generated by the oscillator 22 to the transponder 1 through the antenna 21 for a predetermined time. The transmission time is determined in such a way sufficient power can be charged into the capacitor of the interface 14 of the transponder 1. After transmission, the contact blade of the switch 25 is immediately changed over to an R side, to receive the signal transmitted from the transponder 1. The received signal is amplified by the amplifier 23 and further demodulated by the demodulator 24 to obtain an ID number.

The immobilizer unit 3 is composed of a microcomputer (CPU) 3A and its peripheral components such as a non-volatile memory 31, interfaces 32 and 33, etc., and controls the antitheft operation in the antitheft mode by communications with the transmit/receive unit 2 through the interface 33 and with the engine control unit 5 through the interface 32, respectively. Further, the immobilizer unit 3 is connected to a key cylinder switch 34 turned on when the ignition key 4 is inserted into the ignition key cylinder.

Therefore, when an ignition key is inserted into the key cylinder, since the key cylinder switch 34 is turned on, the microcomputer (CPU 3A) of the immobilizer unit 3 reads the ID number of the ignition key inserted into the key cylinder through the transmit/receive unit 2, and collates the read ID number with ID numbers previously registered in the memory 31. When the ID number of the inserted key matches one of the registered ID numbers, control outputs an engine start enable signal to the engine control unit 5 to start the engine. On the other hand, however, when the ID number of the inserted key does not match one of the registered ID numbers, control does not output an engine start enable signal to the vehicle engine control unit 5 to prevent the vehicle engine from being started.

A starter drive circuit 6 is a circuit for drive a starter motor 64 to start the engine whenever an ignition key 4 is inserted into the ignition key cylinder and further rotated to a start (ST) position. When a control switch 52 (described later) of the engine control unit 5 and a start (ST) switch 62 are both turned on, since current flows from a battery BAT to a relay coil 63c through a fuse 61, a relay 63 is energized, so that a relay contact 63a is closed, with the result that power can be supplied from the battery BAT to a starter motor 64 through the fuse 61, the start switch 62, and the relay contact 63a to drive the starter motor 64. On the other hand, when the control switch 52 of the engine control unit 5 is opened, since the relay 63 is deenergized, the relay contact 63a is kept open, so that the starter motor 64 can not be driven.

Further, the engine control unit 5 is composed of a microcomputer (CPU 5A) and its peripheral circuits (an interface 51, the control switch 52, etc.) and controls the start and stop and the speed of the engine. Further, the engine control unit 5 transmits an ID collation result request signal to the immobilizer unit 3 and receives the engine start enable signal from the immobilizer unit 3 through the interface 51.

Further, the engine control unit 5 executes a control program (described later) for monitoring a cranking voltage of the starter motor 64 through a motor terminal S. Here, when the cranking voltage is detected for a predetermined time period (e.g., several seconds) or longer, the engine control unit 5 transmits an ID collation result request signal to the immobilizer unit 3 even during the cranking period, and stops the engine when the collation is disabled or the ID number is not registered. In more detail, the engine control unit 5 opens the control switch 52 to keep the starter motor 64 undriven. In this case, at the same time, engine control unit 5 outputs a fuel stop command to a fuel supply device (not shown) and further stops ignition signals from being applied to ignition coils of the engine.

In usual, the activation time of the starter motor 64 required to start the engine is several seconds. Therefore, when a predetermined time sufficiently longer than this starter motor activation time (more than several seconds) is determined until the immobilizer unit 3 begins to collate an ID number of the ignition key with the stored ID numbers, it is possible to detect such a theft that a cranking voltage is intentionally kept applied to the monitor terminal S to disable the collation operation of the antitheft apparatus so that the engine can be started by use of an ignition key whose ID number is not registered. This is because in the ordinary engine start, the cranking voltage cannot be applied to the monitor terminal S (the starter relay 63) for such a long time due to a battery voltage drop by a large load. Further, in this case, when the starter motor 64 is not driven, since the battery voltage is kept stable; that is, since a stable voltage can be supplied from the battery BAT to the transmit/receive unit 2, the mobilizer 3 and the engine control unit 5, the ID collation error will not occur between the respective circuits of the antitheft apparatus. Therefore, after a predetermined time has elapsed after the detection of the cranking voltage at the monitor terminal S, the engine control unit S transmits an ID collation result request signal to the immobilizer unit 3. In response to this ID collation result request signal, the immobilizer 3 transmits a transmission command to the transmit/receive unit 2 to read an ID number from the transponder 1 of the ignition key now being used for the ID number collation. In case the collation is disabled or the collated ID number is not registered, the immobilizer unit 3 does not transmit an engine start enable signal to the engine control unit 5. On the basis of no reception of the engine start enable signal, the engine control unit 5 opens the control switch 52 to keep the starter motor 64 undriven or to stop the engine from being driven even if the engine has been already started.

Figure 3:
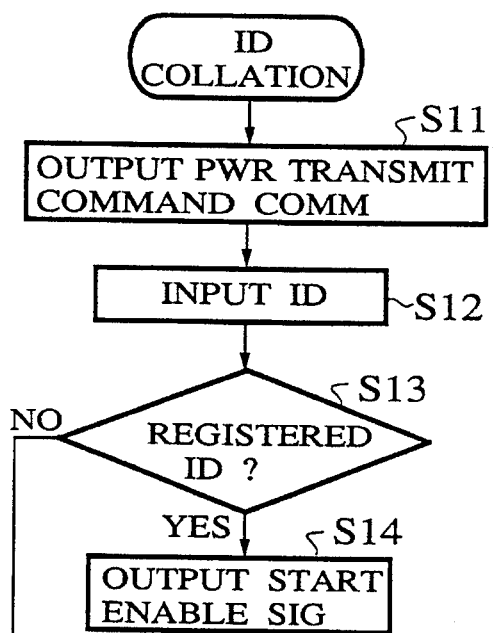
FIG. 3 is a flowchart showing a procedure of ID number collating program.
Figure 4:
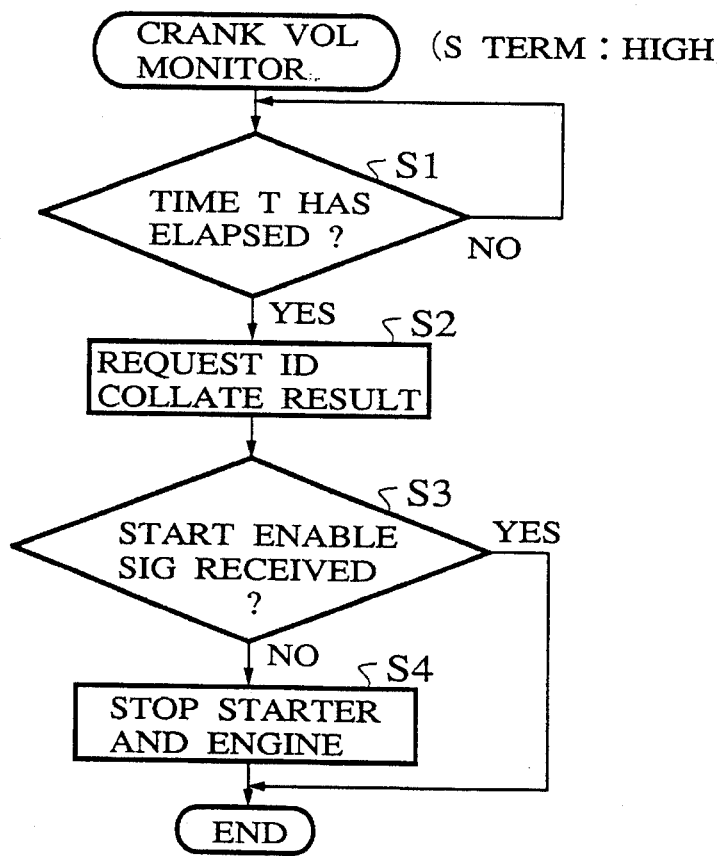
FIG. 4 is a flowchart showing a procedure of a cranking voltage monitoring program according to the present invention.

The above-mentioned operation will be described in further detail with reference to a flowchart showing an ID collation program executed by the immobilizer unit 3 shown in FIG. 3 and another flowchart showing a cranking voltage monitoring program executed by the engine control unit 5 shown in FIG. 4.

When an ignition key 4 is inserted into the ignition key cylinder and thereby the cylinder switch 34 is turned on or when the engine control unit 5 transmits an ID collation result request signal to the immobilizer unit 3 through the interface 32, the CPU 3A (referred to as control, hereinafter) of the immobilizer unit 3 starts the program shown in FIG. 3.

In step S11, control outputs a power transmit command to the control circuit 26 of the transmit/receive unit 2. In response this command, the transmit/receive unit 2 changes over the switch 25 to the T side, so that the pulse signal of a predetermined frequency is generated from the oscillator 22 for a predetermined period and Further transmitted to the transponder 1 of the ignition key through the antenna 21. Immediately after the transmission, the switch 25 is changed over from the T side to the R side to receive the ID number code signal transmitted by the transponder 1. The received ID number signal is demodulated by the demodulator 24 into an ID number.

In step S12, control inputs the demodulated ID number of the ignition key now inserted into the ignition key cylinder to the immobilizer unit 5.

In step S18, control collates the inputted ID number with the ID numbers stored in the memory 81, that is, checks whether the received ID number is registered. If YES, control proceeds to step S14.

In step S14, since the received ID number is registered, control outputs an engine start enable signal to the engine control unit 5 through the interface 32.

If NO, since the collation is not executed or the ID number is not registered, control ends the program and does not output an engine start enable signal to the engine control unit 5.

On the other hand, when an H-level cranking voltage is applied to the monitor terminal S, the CPU 5A (referred to as control, hereinafter) of the engine control unit 5 starts to execute the program shown in FIG. 4.

In step S1, control checks whether a time duration T has elapsed after the high-level voltage is applied to the control terminal S. If NO, control keeps the immobilizer unit 8 inoperative. If YES, control proceeds to step S2.

In step S2, control outputs an ID collation result request signal to the immobilizer unit 3 through the interface 51.

In step S3, after the ID number is collated with the stored ID numbers in accordance with the procedure as explained with reference to FIG. 3, control checks whether an engine start enable signal is received. If YES, control ends the program processing to allow the engine to be started. If NO, control proceeds to step S4.

In step S4, control opens the control switch S2 to keep the starter motor 64 undriven and further to stop the engine where already started.

As described above, in the antitheft apparatus according to the present invention, whenever the high cranking voltage is applied to the starter motor, the antitheft apparatus is kept inoperative for a predetermined time period but operative after a predetermined time has elapsed. Therefore, even if the cranking voltage is intentionally applied to disable the antitheft apparatus and thereby to start engine with the use of a non-registered ignition key, since the antitheft apparatus can be restored after a predetermined time has elapsed and thereby the ID collation can be executed, it is possible to prevent the engine from being started by use of a non-registered ignition key or to stop the already started engine, thus improving the antitheft characteristics of the antitheft apparatus.

What is claimed is:

1. An antitheft apparatus for an automotive vehicle, comprising:

a transponder provided in an ignition key, for storing an ID number of its own ignition key therein;

a receive unit for receiving the ID number of the ignition key inserted into the ignition key cylinder;

an immobilizer unit for storing ID number and for outputting an engine start enable signal when the received ID number matches one of the stored ID numbers and not outputting the engine start enable signal when the received ID number does not match any of the stored ID numbers; and an engine control unit for enabling an engine to drive in response to the reception of the engine start enable signal but disabling the engine to drive in response to the no reception of the engine start enable signal, said engine control unit having:

means for detecting an engine cranking operation;

means for checking whether a predetermined time has elapsed after the engine has been cranked; and means for keeping said immobilizer unit inoperative for the predetermined time and allowing said immobilizer unit to be operative after the predetermined time has elapsed.

2. The antitheft apparatus for the automotive vehicle of claim 1, wherein said engine control unit stops the engine drive already started, when the immobilizer unit detects that an ID numbers collation is disabled or a collated ID number is not registered by the ID number collation executed after the predetermined time has elapsed.

3. The antitheft apparatus for the automotive vehicle of claim 1, wherein the engine cranking operation is detected by detecting a voltage applied to an engine starter motor.

4. A method of keeping an antitheft apparatus inoperative, comprising the steps of:

monitoring whether a cranking voltage is applied to an engine starter motor;

if the cranking voltage is applied to the engine starter motor, setting the antitheft apparatus inoperative;

checking whether a predetermined time has elapsed;

if the predetermined time has not elapsed, keeping the antitheft apparatus inoperative for the predetermined time;

if the predetermined time has elapsed, enabling the antitheft apparatus checking whether an ignition key is inserted into an ignition key cylinder;

if the ignition key is inserted into the ignition key cylinder, transmitting a transmit signal to a transponder of the ignition key inserted into the ignition key cylinder to receive an ID number of the ignition key;

operation of antitheft apparatus including checking whether the received ID number is registered;

if the received ID number is registered, outputting an engine start enable signal; and if the received ID number is not registered, not outputting the engine start enable signal.

\* \* \* \* \*